(12) United States Patent
Almohsin et al.

(10) Patent No.: US 12,227,692 B1
(45) Date of Patent: Feb. 18, 2025

(54) COMPOSITE GELS FOR WATER SHUTOFF IN FRACTURED RESERVOIRS

(71) Applicant: SAUDI ARABIAN OIL COMPANY, Dhahran (SA)

(72) Inventors: Ayman Almohsin, Dhahran (SA); Bader Ghazi Alharbi, Dammam (SA); Saad Almutari, Dammam (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 0 days.

(21) Appl. No.: 18/446,404

(22) Filed: Aug. 8, 2023

(51) Int. Cl.
C09K 8/504 (2006.01)
C09K 8/508 (2006.01)
E21B 33/138 (2006.01)

(52) U.S. Cl.
CPC ............ *C09K 8/5083* (2013.01); *C09K 8/504* (2013.01); *E21B 33/138* (2013.01); *C09K 2208/10* (2013.01)

(58) Field of Classification Search
None
See application file for complete search history.

(56) References Cited

U.S. PATENT DOCUMENTS

| | | | |
|---|---|---|---|
| 11,268,009 B2 | 3/2022 | Bai et al. | |
| 2010/0016183 A1* | 1/2010 | Roddy | C09K 8/428 507/224 |
| 2011/0094746 A1* | 4/2011 | Allison | C09K 8/424 166/308.5 |
| 2016/0362594 A1 | 12/2016 | Rojas et al. | |
| 2018/0346797 A1* | 12/2018 | Kalgaonkar | C09K 8/5751 |
| 2019/0375982 A1 | 12/2019 | Johnson et al. | |
| 2020/0071601 A1* | 3/2020 | Long | C09K 8/588 |
| 2020/0407622 A1 | 12/2020 | Bai et al. | |
| 2020/0408063 A1* | 12/2020 | Almohsin | E21B 33/138 |
| 2022/0363970 A1* | 11/2022 | Hamza | C08K 3/36 |

FOREIGN PATENT DOCUMENTS

| | | |
|---|---|---|
| CN | 115286750 A | 11/2022 |
| WO | 2021141598 A1 | 7/2021 |
| WO | 2021257505 A1 | 12/2021 |

(Continued)

OTHER PUBLICATIONS

Bergna; "The Colloid Chemistry of Silica"; Advances in Chemistry; American Chemical Society; 1994; p. 1-47. (Year: 1994).*

(Continued)

*Primary Examiner* — Andrew Sue-Ako
(74) *Attorney, Agent, or Firm* — Osha Bergman Watanabe & Burton LLP

(57) ABSTRACT

A composition includes a colloidal solution which includes a solvent, a plurality of nanoparticles dispersed in the solvent, an activator dissolved in the colloidal solution, and a plurality of gel particles suspended in the colloidal solution. A method for water shutoff includes injecting a composition into a fracture near a water zone in a formation, wherein the composition includes a colloidal solution which includes a solvent, a plurality of nanoparticles dispersed in the solvent, an activator dissolved in the solvent, and a plurality of gel particles suspended in the colloidal solution.

13 Claims, 15 Drawing Sheets

(56) References Cited

FOREIGN PATENT DOCUMENTS

WO 2022098411 A1 5/2022

OTHER PUBLICATIONS

A. Paprouschi, et al., "Effect of silicate sodium and graphene nanoplatelets on morphology and rheology characteristics of new synthesized preformed particle gel (PPG) for water shut-off treatment", Journal of Petroleum Science and Engineering, 2021, vol. 204, 108736, pp. 1-18 (18 pages).
S. Lei et al., "Types and Performances of Polymer Gels for Oil-Gas Drilling and Production: A Review", Gels, Jun. 17, 2022, vol. 8, No. 386, pp. 1-22 (22 pages).
Z. Chen et al., "Polyacrylamide and its derivatives for oil recovery", Missouri University of Science and Technology, Fall 2016, pp. 1-205 (226 pages).
X. Tang et al., "Regulation of polymerizable modification degree of nano-SiO2 and the effects on performance of composite microsphere for conformance control", Colloids and Surfaces A, Oct. 14, 2019, pp. 1-12 (12 pages).
L. Ma et al., "Environmentally Benign Hydrogel: Nano-Silica Hybrid Hydrolyzed Polyacrylamide/ Polyethyleneimine Gel System for Conformance Improvement in High Temperature High Salinity Reservoir", Society of Petroleum Engineers-188654-MS, Nov. 13-16, 2017, pp. 1-13 (13 pages).
J. Huang et al., "Systematic Approach to Develop a Colloidal Silica Based Gel System for Water Shut-Off", Society of Petroleum Engineers-183942-MS, Mar. 6-9, 2017, pp. 1-15 (15 pages).
S. Tao et al., "Evaluation of a Novel Recrosslinkable Hyperbranched Preformed Particle Gel for the Conformance Control of High-Temperature Reservoirs with Fractures." SPE J., Dec. 20, 2022, doi: https://doi.org/10.2118/209451, pp. 1-13 (13 pages).
J. Pu et al., "A Recrosslinkable Preformed Particle Gel for Conformance Control in Heterogeneous Reservoirs Containing Linear-Flow Features", SPE J. 2019, vol. 24, No. 4, pp. 1714-1725, SPE-191697-PA. 10.2118/191697-PA. (12 pages).
B. Bai et al., "Preformed Particle Gel for Conformance Control: Factors Affecting Its Properties and Applications", Paper presented at theSPE/DOE Symposium on Improved Oil Recovery, Tulsa, Oklahoma, USA, Apr. 17-21, 2004. SPE-89389-MS. 10.2118/89389-MS, pp. 1-10 (10 page).
A. Almohsin et al., "A Nano Method for a Big Challenge: Nanosilica-Based Sealing System for Water Shutoff", Paper presented at the SPE Middle East Oil & Gas Show and Conference, Nov. 2021, pp. 1-13 (13 pages).
International Search Report issued for corresponding international patent application No. PCT/US2024/041443, mailed Nov. 29, 2024 (6 pages).
Written Opinion issued for corresponding international patent application No. PCT/US2024/041443, mailed Nov. 29, 2024 (9 pages).

\* cited by examiner

COMPOSITE GELS FOR WATER SHUTOFF IN FRACTURED RESERVOIRS

BACKGROUND

Fractured reservoirs can exhibit high productivity, along with presenting severe technical challenges. A challenging feature of fractured reservoirs is that the permeability of the fractures is orders of magnitude greater than the surrounding matrix rock. High permeability can lead to increased water production in a reservoir when the fractures are connected to a water zone. Therefore, it is desirable to seal the fractures adjacent to the water zone to limit water production in the reservoir if the sealing material can withstand the conditions in the formation.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In one aspect, embodiments disclosed herein relate to a composition which includes a colloidal solution which includes a solvent; a plurality of nanoparticles dispersed in the solvent; an activator dissolved in the colloidal solution; and a plurality of gel particles suspended in the colloidal solution.

In another aspect, embodiments disclosed herein relate to a method for water shutoff which includes injecting a composition into a fracture near a water zone in a formation; wherein the composition includes a colloidal solution which includes a solvent; a plurality of nanoparticles dispersed in the solvent; an activator dissolved in the solvent; and a plurality of gel particles suspended in the colloidal solution.

Other aspects and advantages of the claimed subject matter will be apparent from the following description and the appended claims.

DETAILED DESCRIPTION

Fractured reservoirs pose severe technical challenges, but may also exhibit high productivity. The main challenge is that the permeability of the fractures is orders of magnitude greater than the matrix rock. When fractures present in a formation are connected to a water zone, substantially increased water production may result. In such a situation, it may be highly beneficial to reduce water production by closing off the fractures connected to the water zone.

Figure 1:
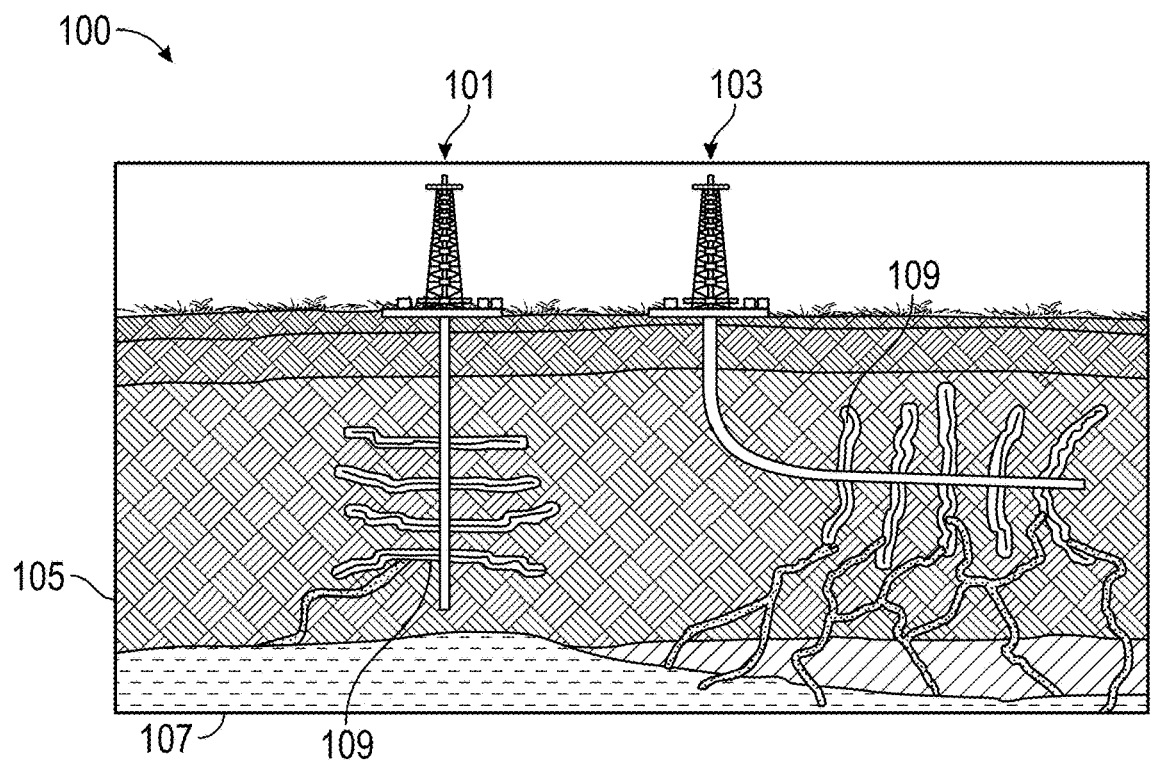
FIG. 1 is a schematic depiction of a fractured oil reservoir in accordance with one or more embodiments of the present disclosure.

FIG. 1 illustrates a fractured oil reservoir adjacent to a water producing formation. A fractured oil reservoir 100 has water production occurring in both vertical and horizontal wells. As shown, vertical well 101 and horizontal well 103 recover oil from hydrocarbon zone 105. Hydrocarbon zone 105 is adjacent to a water formation 107. When a hydrocarbon zone 105 is close to a water producing formation 107, fractures 109 may connect the hydrocarbon zone 105 and water producing formation 107. The connection may lead to excess water production, which is a common feature of fractured reservoirs. Permanently closing the fractures that connect the hydrocarbon zone 105 to the water producing formation 107 may address excess water production. The invention described herein is related to a composition that may be used to block fractures and void spaces that are present in oil reservoirs. One advantage of the current invention over existing polymer gel systems is the ability to inject the composition as one component as opposed to having to mix components at the surface of the well.

Figure 2:
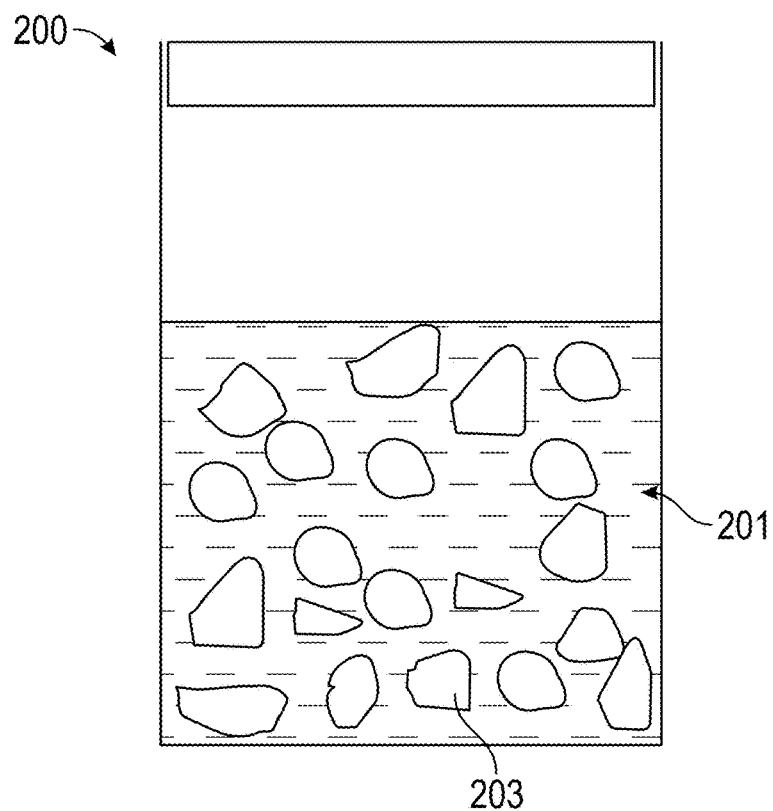
FIG. 2 is a schematic depiction of a composition for formation of composite gels in accordance with one or more embodiments of the present disclosure.

FIG. 2 illustrates a preparation of swellable gel particles and a colloidal solution according to one or more embodiments of the present disclosure. The composition 200 comprises a colloidal solution 201 that includes a solvent, a plurality of nanoparticles dispersed in the solvent, and an activator dissolved in the colloidal solution. Composition 200 further comprises a plurality of gel particles 203 suspended in the colloidal solution.

Generally, a colloidal solution is a solution made up of one material finely dispersed within another material. For instance, nanoparticles that scatter light dispersed in a liquid medium is an example of a colloidal solution. According to one or more embodiments of the present disclosure, the colloidal solution 201 is stable for storage such that the nanoparticles remain dispersed within the liquid medium. Stability in colloids is typically achieved by adjusting the surface properties of the dispersed nanoparticles. Adjusting the surface properties of nanoparticles for colloidal stability may include surface modifications with ionic or non-ionic surfactant groups, which impart repulsion and prevent coalescence of the dispersed nanoparticles. Suitable materials present in the nanoparticles include silica. When silica nanoparticles are used, the nanoparticles are stable due to stabilization by surface groups on the particles. It will be appreciated by one skilled in the art that the solvent's properties may also affect the properties and stability of the colloidal solution. Additionally, the solvent used and presence of additives may control the dispersion of the nanoparticles and bulk properties of the colloidal solution, such as viscosity.

In one or more embodiments, the solvent of the present invention may be water. The solvent disperses the nanoparticles and dissolves the activator. The solvent used needs to be compatible with the gel particles, allowing them to be suspended without physical or chemical damage in a swelled state. The solvent selected must also allow the gelation reaction to proceed at the proper conditions in the formation. Because of the specific chemistry of the gelation reaction, the typical solvent is a sodium silicate-containing solution. It will be understood by one skilled in the art that the solution behavior and reactivity of compounds, such as the activator dissolved in the solvent and the dispersion behavior of the nanoparticles dispersed in the solvent, depend on factors such as the pH, temperature, and concentration of salts or other additives dissolved in the solvent.

In one or more embodiments, the nanoparticles of the colloidal solution include silica nanoparticles. The silica nanoparticles may be surface modified with silanol groups. Any surface modification that enables gelation of the silica nanoparticles in application may be employed. In one or more embodiments, the silica nanoparticles may be sized from 10 to 14 nanometers. As a non-limiting example, silanol modified silica nanoparticles manufactured by Nouryon (located at Haaksbergweg De Oliphant Building, Floor 14 and 15, 1101 BZ, Amsterdam, The Netherlands) may be used. It will be appreciated by one skilled in the art that the properties of the nanoparticles will depend largely on their size and surface modification, in addition to environmental conditions.

In one or more embodiments disclosed herein, the activator of the composition 200 is selected from the group consisting of sodium silicate, sodium chloride, potassium chloride, and sodium silicate. The activator is compatible with the solvent and other components during application before gelation is desired in the formation. It will be generally understood by one skilled in the art that the identity and loading level of the activator will affect gelation behavior. In one or more embodiments, the activator may facilitate nanoparticle gelation through silanol condensation. Gelation should only happen in the conditions present at the fracture in the formation, not beforehand during storage. Even with the activator present in the composition 200, the correct temperature will trigger the gelation.

In one or more embodiments, the gel particles are water-swellable. While the gel particles are readily swelled with water, the gel particles may also be swelled with other aqueous mediums. For instance, the gel particles may be swelled with the colloidal solution, which includes the nanoparticles, the solvent, and the activator. The swelled gel particles possess sufficient mechanical properties to avoid physical degradation under temperature and pressure conditions in the formation. In one or more embodiments, the gel particles may be sized from 500 to 3000 micrometers in their dry state. In one or more embodiments, the gel particles may be sized from 500 to 3000 micrometers in their swelled state.

In one or more embodiments, the gel particles include a water-swellable polymer. The polymer may be selected from the group consisting of N—N methylene bisacrylamide and polyacrylamide. One skilled in the art will appreciate that other polymers that will swell with water and possess similar physical and mechanical properties may be used. For proper performance, the water-swellable polymer is water absorbent such that the gel particles swell in size when saturated with water.

In one or more embodiments, the activator functions to activate gelation of the colloidal solution under formation conditions, such as high temperatures in the range of 150° F. to 300° F. When silica nanoparticles are used with a silanol surface modification, the gelation proceeds through silanol condensation reactions typical of a silica gelation process, where the temperature will affect the rate of gelation. It will be recognized by one with skill in the art that the type and amount of the activator along with the temperature will affect the rate of gelation and adjusting these parameters will allow for adjusting the gelation rate for optimum gelation behavior.

Figure 3:
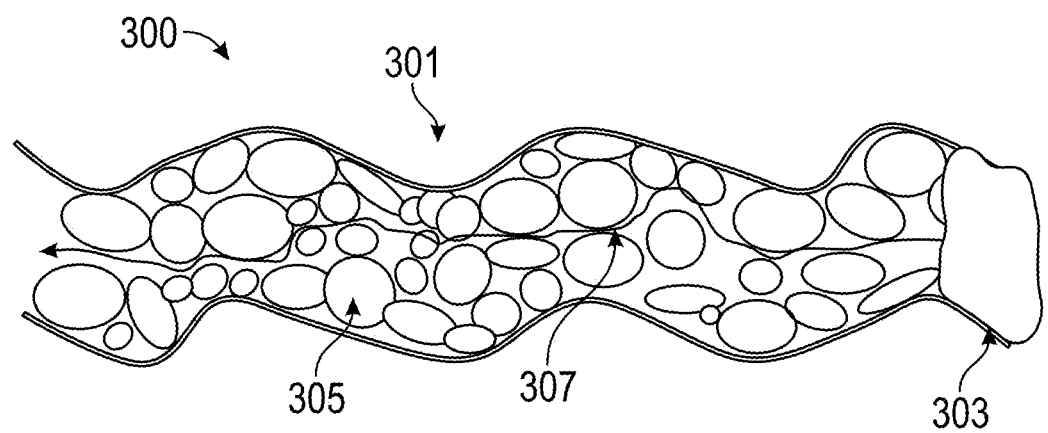
FIG. 3 is a schematic depiction of gel particles used to block a fracture in accordance with one or more embodiments of the present disclosure.

Only using gel particles to fill a fracture may result in the formation of conduit like channels that will allow for water to continue to flow though the fracture, as shown in FIG. 3. Gel pack 300 is formed in a fracture 301 to fill the fracture and prevent water from water zone 303 from flowing through fracture 301. Gel particles 305 cannot fill all void volume in the fracture, which results in the formation of conduit-like channels 307 through which water can flow even though the fracture has been packed with gel particles 305.

Figure 4:
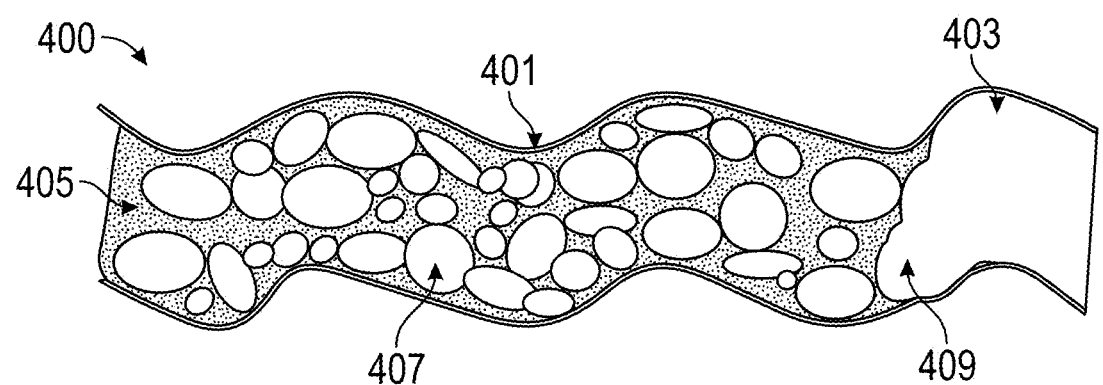
FIG. 4 is a schematic depiction of a composite gel used to block a fracture in accordance with one or more embodiments of the present disclosure.

While only using gel particles to stop water flow in a fracture may result in continued water production because of the formation of conduit-like channels, utilizing gelation of the colloidal solution may fill the remaining void volume as depicted in FIG. 4. Composite gel 400 is formed in a fracture 401 adjacent to a water zone 403. After the activator causes gelation of the nanoparticles, composite gel 400 is formed which includes gelled nanoparticles 405 surrounding the dispersed gel particles 407.

Gelled nanoparticles 405 are a mass of nanoparticles that condensed together after being previously dispersed in the solvent. The condensation of nanoparticles occurs through a gelation reaction, which condenses silanol groups on different nanoparticles together. Nanoparticles are chemically bonded, causing the nanoparticles to coagulate out of the dispersed state and form a mass. Further condensation of silanol groups on the nanoparticle surfaces leads to a chemically gelled mass.

Composite gel 400 blocks water 409 with swollen gel particles 407 taking up most of the volume and preventing the bulk of the flow. The spaces between the micrometer-sized gel particles are sealed by rigid bulk gels formed from the gelled nanoparticles. Without the presence of rigid bulk gels, water may still flow through the fracture. In one or more embodiments, the combination of micrometer-scale swollen gel particles with nanoparticles that undergo gelation seal the fracture by using structures at different size scales. The combination of gel particles dispersed in the gelled nanoparticle mass imparts the desirable physical property of increased storage modulus, which improves mechanical strength and durability in use.

In one or more embodiments, the composite gel exhibits enhanced properties compared to the gel particles simply swelled with water. The composite gel may have suitable properties for interacting with the formation to reliably stop water flow. The composite gel may exhibit increased thermal stability and gel strength compared to corresponding gel particles simply swelled with water. The composite gel may exhibit a weight loss of less than 25% at 900° C., compared to a weight loss of more than 45% at 900° C. for the gel particles swelled with water. The reduced weight loss of the composite gel compared to the gel particles swelled with water shows the relative increased thermal stability of the composite gel. The composite gel may exhibit an elastic modulus of 20,000-30,000 Pa, compared to an elastic modulus of 3,000-4,000 Pa for the gel particles swelled with water.

In one or more embodiments, the nanoparticles include silica nanoparticles, and the gelled nanoparticles impart a desirable thermal stability to the composite gel. Silica nanoparticles lead to a significant increase in the thermal stability of the composite gel versus gel particles swelled with water to saturation. In addition, the gelled nanoparticles impart desirable mechanical properties to the composite gel, which may lead to an increase in gel strength of the composite gel relative to the gel particles swelled with water to saturation. For example, the gel strength may increase from 3000 Pa for the gel particles swelled with water to 30,000 Pa for the composite gel wherein silica nanoparticles were used.

Figure 5:
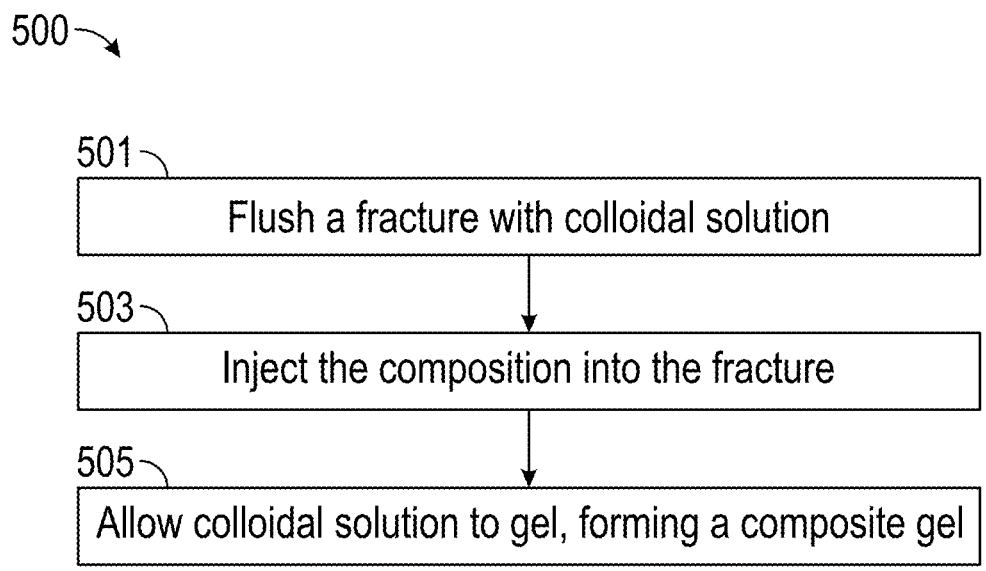
FIG. 5 is a flow diagram depicting a method for water shutoff in accordance with one or more embodiments of the present disclosure.

FIG. 5 is a flow diagram illustrating a method for water shutoff in a formation. Water shutoff occurs when water flow from a water formation is stopped by blocking fractures where water was flowing, stopping water production in the well. Method 500 uses the composition described herein to block a fracture. A fracture in a formation adjacent to a water formation is flushed with a colloidal solution, at block 501. Referring to FIG. 2, the colloidal solution may be colloidal solution 201. Referring again to FIG. 5, the composition is injected into the fracture, at block 503. The colloidal solution is allowed to gel, forming a composite gel that includes the plurality of gel particles embedded in the gelled nanoparticle mass, at block 505. In further embodiments, allowing the colloidal solution to gel occurs in situ in the formation.

Pre-flushing the fracture with the colloidal solution alone serves to reduce dilution of the colloidal solution contained in the composition with water or other fluids present at the fracture. In pre-flushing an area, the goal is to saturate the zone with colloidal solution so that when the composition is injected, it does not dilute due to water or other fluids present at the fracture. The pre-flushing may optimize the placement of the composite gel to seal the fracture. Optimized placement will most efficiently reduce water production and enable the composite gel to remain resilient in sealing the fracture over extended periods. After the optional pre-flush, the composition is injected into the fracture. In one or more embodiments, the composition may be injected into the fracture until pressure builds up as the composition begins to block the fracture. Eventually, the pressure stabilizes as the composition penetrates the fracture and the colloidal solution is allowed to gel.

Once the composition has reached the formation, the composition will be under high temperature conditions in the fracture, leading to gelation of the composition. Gelation occurs because the repulsive forces that keep the nanoparticles apart are reduced with increasing temperatures, and relative reaction rates are increased with increasing temperatures. The increased temperature allows the activator to react with colliding nanoparticles and begin forming a gel. Under the conditions in the formation including high temperature conditions, the nanoparticles collide and chemically condense, forming a physical mass. The physical mass of gelled nanoparticles may also trap the swelled gel particles, and thus form the composite gel. The gelled mass filling in any spaces between the gel particles reduces water production compared to using only gel particles to block the fracture. It will be appreciated by someone skilled in the art that the properties of the composite gel may be determined by the properties of the swelled gel particles and the properties of the gelled nanoparticle mass. The combination of the colloidal solution with gel particles allows the composition to penetrate into water bearing fracture zones without damaging porous media bearing oil.

EXAMPLES

Figure 6:
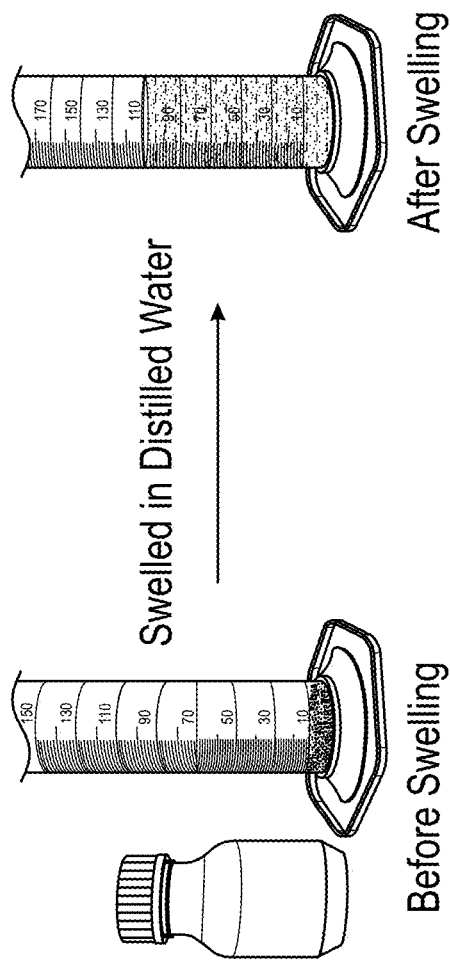
FIG. 6 is an illustration of a gel particle size change after swelling with water in accordance with one or more embodiments of the present disclosure.
Figure 6:
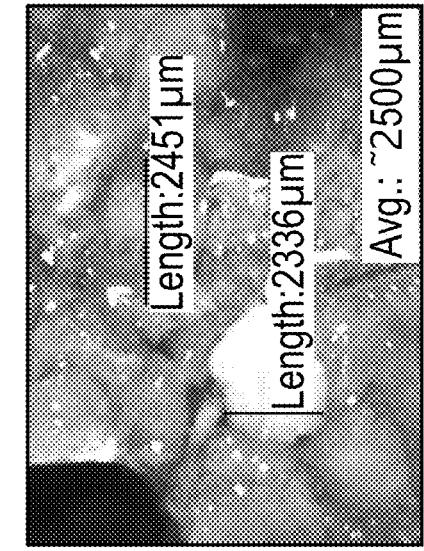
Figure 6:
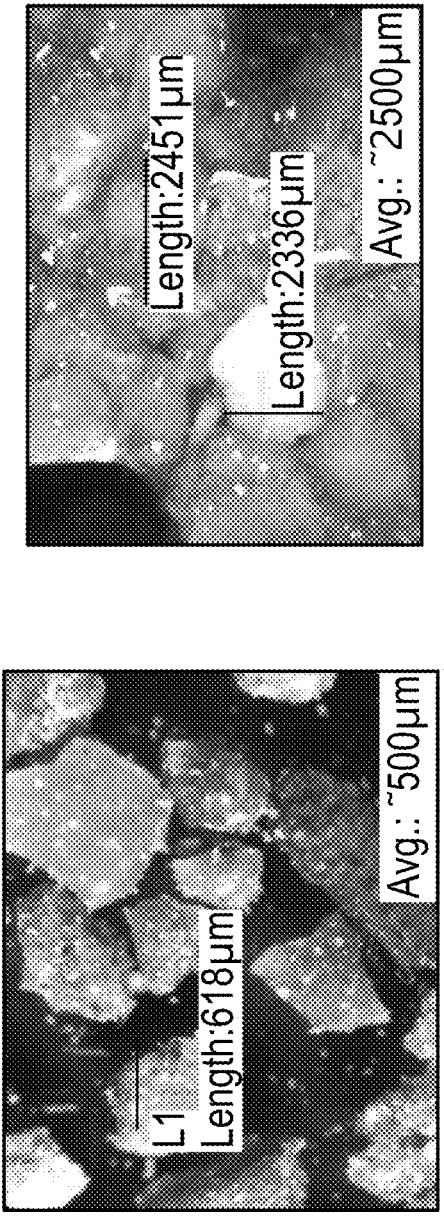
Figure 7:
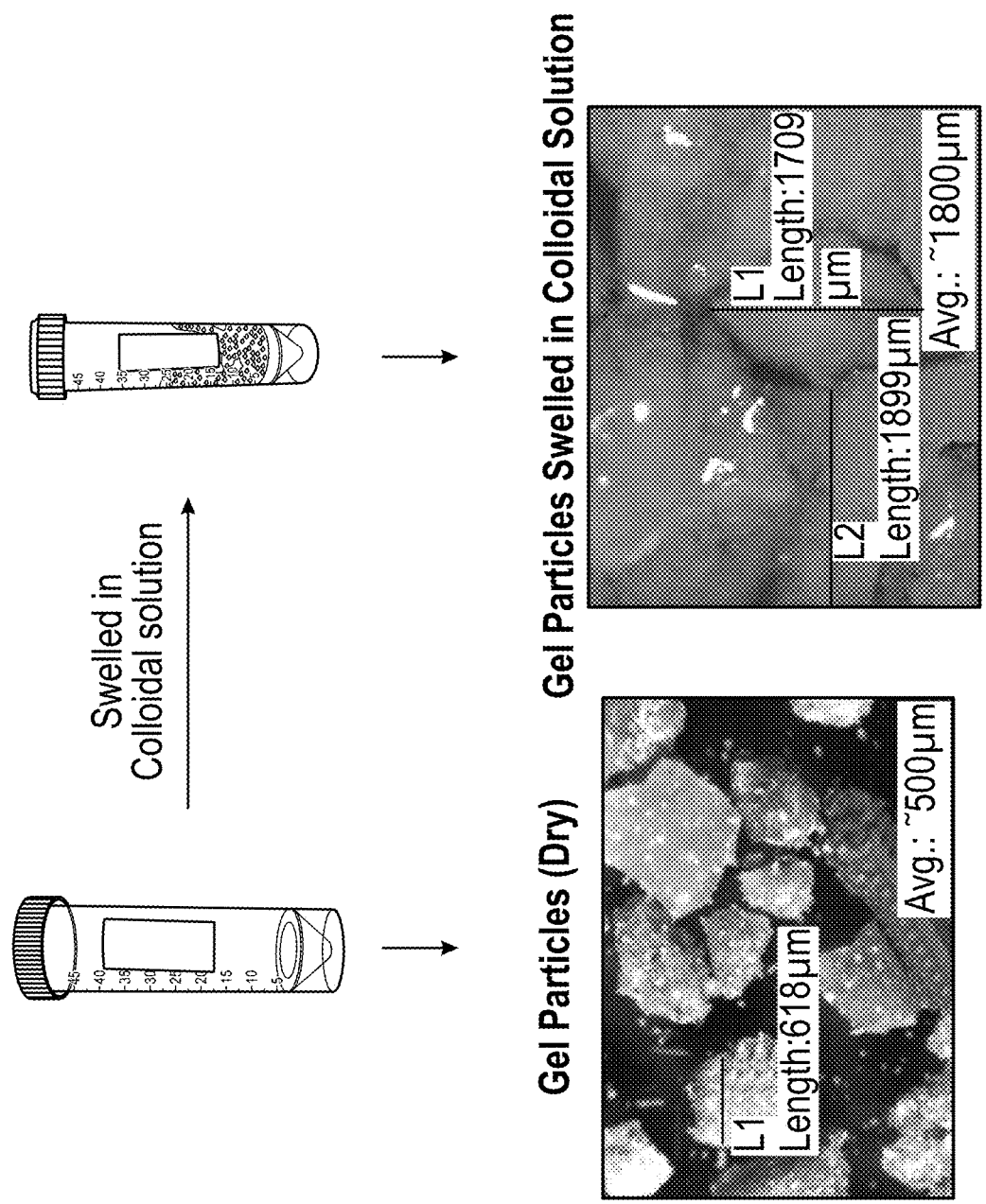
FIG. 7 is an illustration of a gel particle size change after swelling with colloidal solution in accordance with one or more embodiments of the present disclosure.

FIGS. 6 and 7 illustrate swelling of gel particles. FIG. 6 shows pictures of gel particles before and after swelling with water to illustrate the size change. The average size for a gel particle in its dry state was around 500 micrometers (μm). When saturated with water the gel particle swelled to 2500 μm in size. FIG. 7 shows pictures of gel particles before and after swelling with the colloidal solution to illustrate the size change. The gel particles swelled from 500 μm in size to 1800 μm in size when equilibrated in the colloidal solution with activator.

Figure 8:
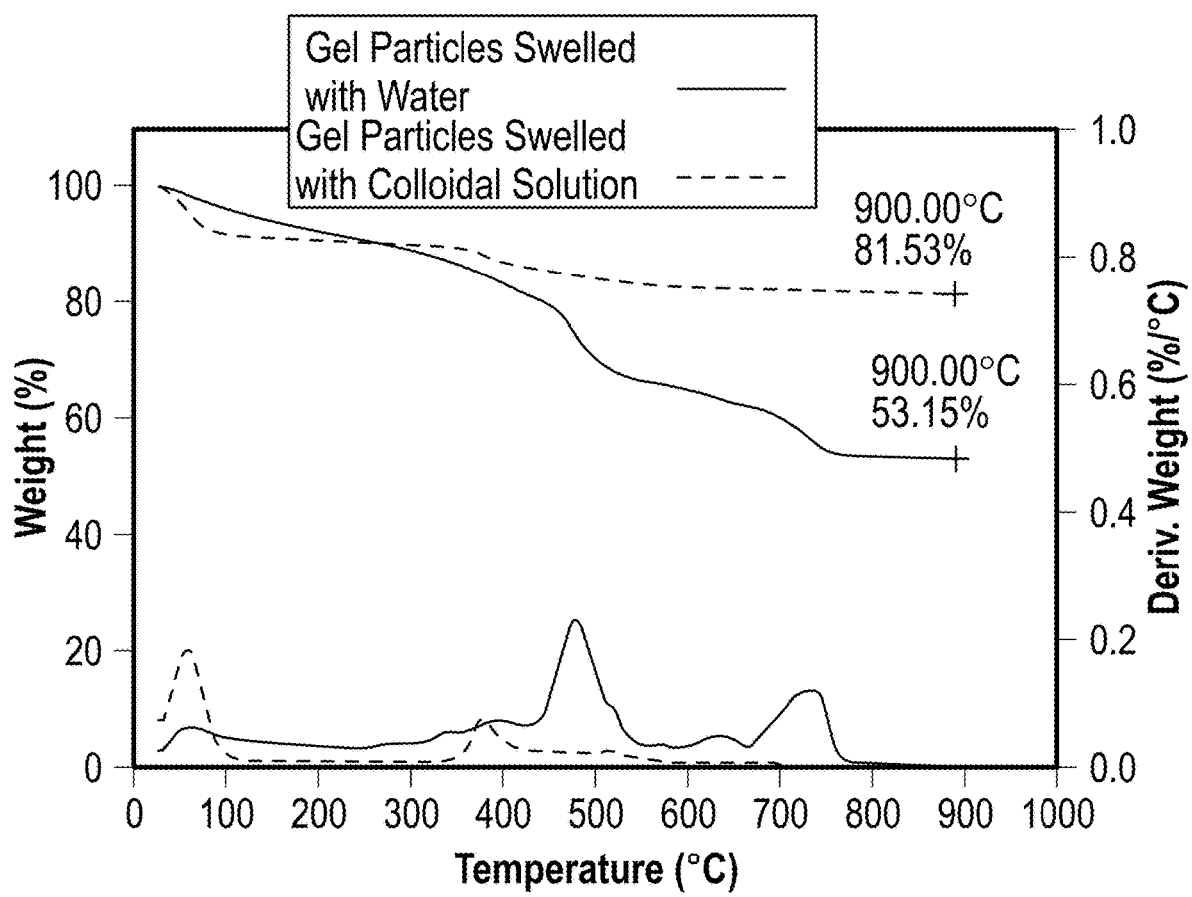
FIG. 8 is a thermogram showing a thermogravimetric analysis of gel particles swelled with water compared to gel particles swelled with colloidal solution in accordance with one or more embodiments of the present disclosure.

FIG. 8 shows data from a thermogravimetric experiment. The data shown in FIG. 8 indicate increased thermal properties of the gel particles swelled with the colloidal solution wherein the nanoparticles dispersed in the colloidal solution are silica nanoparticles compared to gel particles swelled with water alone. The obtained thermograms revealed three decomposition regions. The weight losses in the first region between 25-300° C. can be assigned to the loss of moisture and light volatile (HC) materials, while the weight loss in the second region between 300-600° C. can be ascribed to the decomposition of degradable inorganic ingredients and/or the evaporation of heavier hydrocarbon. Additional weight loses past 600° C. may be attributed to further evaporation of liquids at higher temperatures. The semiquantitative result indicated that the total weight losses (TWL) of the samples are approximately 47 wt. % for the gel particles swelled with water alone and 18 wt. % for the gel particles swelled with the colloidal solution, while the residual masses are found to be approximately 53 wt. % for the gel particles swelled with water alone and 82 wt. % for the gel particles swelled with the colloidal solution. The maximum weight loss was recorded at around 500° C. for gel particles swelled with water alone with a weight loss of about 47% at 700° C., which can be attributed to water evaporation and degradation. The gel particles swelled in colloidal solution recorded a lower weight loss of about 19% at 900° C. The gel particles swelled in colloidal solution recorded a lower weight loss above 400° C. of about 19% compared to about 47% for gel particles swelled with water alone. The reduced weight loss of the gel particles swelled with the colloidal solution compared to the weight loss of gel particles swelled with water alone demonstrates the higher thermal stability of the composite gel compared to the gel particles alone, as composite gel is formed from the gel particles swelled with colloidal solution during the thermogravimetric experiment. This shows that the thermal stability of the gel particles is increased by swelling with the colloidal solution.

Figures 9A, 9B:
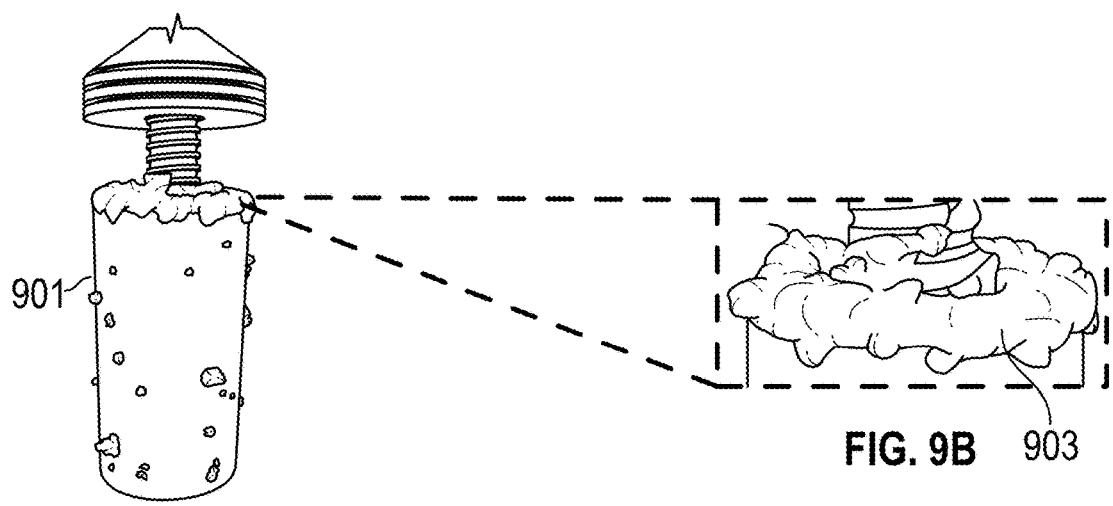
FIGS. 9A and 9B illustrate a view and an expanded view respectively of a viscometer experimental setup used in accordance with one or more embodiments of the present disclosure.

Viscometric analysis was used to investigate the mechanical properties of composite gels that utilize silica nanoparticles in the colloidal solution to determine the temperature-dependent gelation behavior of silica-based composite gels. FIGS. 9A and 9B show a view and an expanded view of a typical experimental set-up for viscometric analysis. A viscometer 901 was used to measure the gelation behavior of composite gels 903 formed from a composition comprising a colloidal solution that includes a solvent, a plurality of nanoparticles dispersed in the solvent, an activator dissolved in the colloidal solution and a plurality of gel particles suspended in the colloidal solution.

Figure 10:
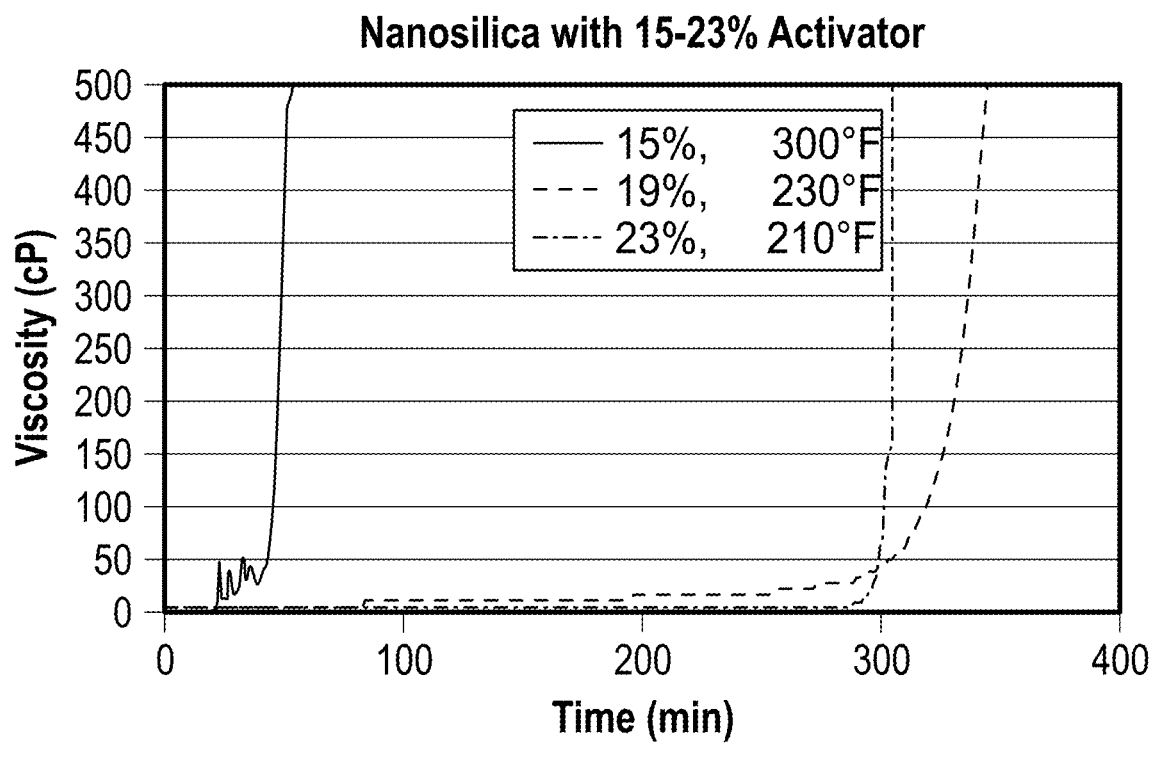
FIG. 10 is a graph illustrating a comparison of gelation times of compositions with varying activator levels at varying temperatures in accordance with one or more embodiments of the present disclosure.

FIG. 10 depicts the changes in the gelation time of different fluid samples at 210° F. with 23% activator, 230° F. with 19% activator, and 300° F. with 15% activator. Measuring the viscosity change over time at different temperatures provided information about the temperature-dependent gelation behavior of the composition described above in forming composite gels. Zeta potential are values that can be used as an indicator of the stability of nanoparticles in solution. The initial colloidal system is stable and usually has a high negative zeta potential value as it directly measures the particle-particle repulsion forces in a colloidal suspension. In the application of the composite gel for water shutoff, it is expected that the gelation process starts once the colloidal system is destabilized from the initial state. For higher temperatures, the zeta potential of the system was lower. Thus, the colloidal system became less stable with higher temperatures, indicating the gelation process can be activated with higher temperature. When considering field operation, the cooling effect of the reservoir is an important parameter because it can affect the gelation time. While pumping the material from surface to reservoir, the reservoir temperature will eventually decrease from downstream to upstream. To account for this, the gelation can be adjusted based on the measured reservoir temperature. As described above, incorporation of silica nanoparticles into a composite gel increases the mechanical properties of the composite gel relative to the gel particles swelled with water.

Figure 11:
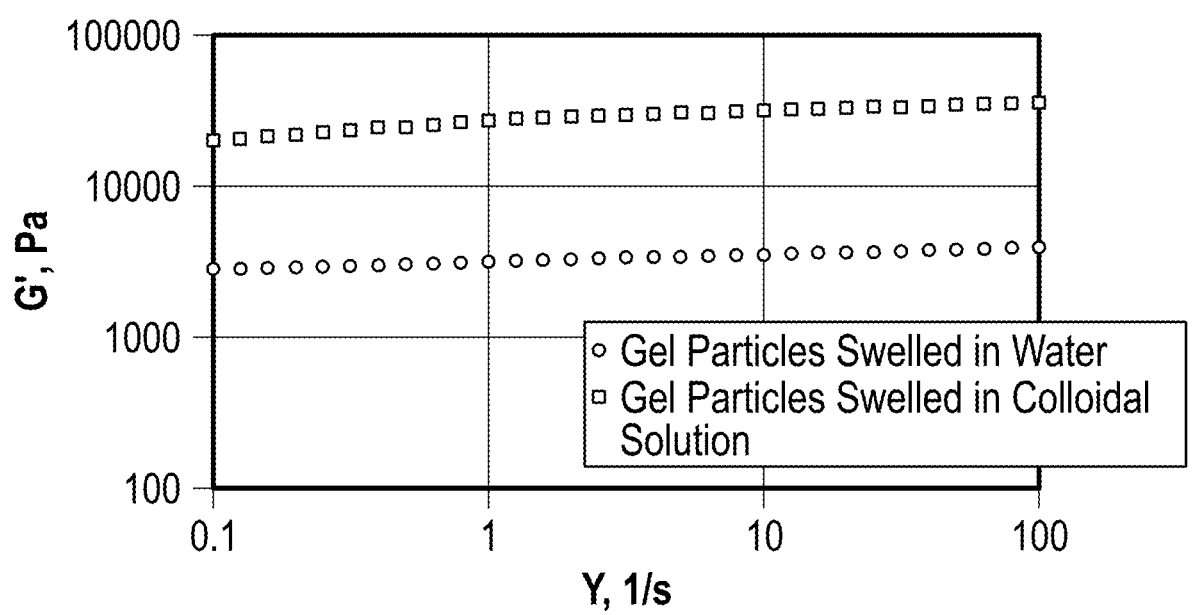
FIG. 11 illustrates a dynamic mechanical analysis (DMA) comparison of gel particles swelled with water alone compared to a composite gel in accordance with one or more embodiments of the present disclosure.

FIG. 11 shows the increased mechanical properties of a composite gel compared to gel particles swelled with water according to a dynamic mechanical analysis. The results indicate that the storage modulus G' value was higher in the composite gels than gel particles swelled with water alone. Consequently, incorporation of gels formed from silica nanoparticles enhanced the composite gel strength compared to the gel particles swelled with water. For example, the gel strength may increase from 2,800 Pa for the gel particles swelled with water to 20,000 Pa for the composite gel wherein silica nanoparticles were used, as measured at room temperature, after the composite gel has been formed under high temperature conditions.

Figure 12A:
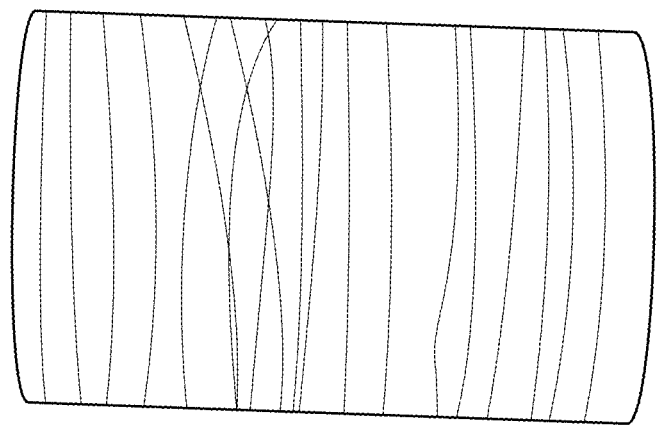
FIGS. 12A and 12B illustrate a side view and an end view respectively of a fractured core plug used in core flooding tests in accordance with one or more embodiments of the present disclosure.
Figure 12B:
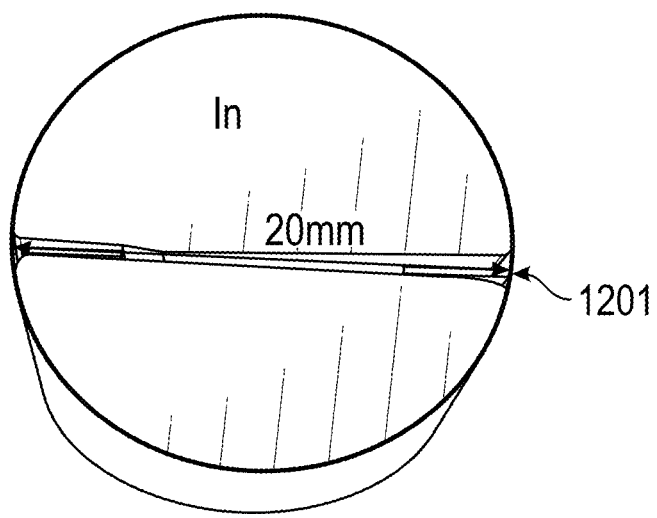

A core flooding test was performed to determine the injection pressure and plugging efficiency of gel particles swelled with water. FIGS. 12A and 12B illustrate a side view and an end view respectively of a representative example of a core plug. A fractured core plug 1201 having a fracture 1203 was used, where the opening of the fracture 1203 was approximately 1 millimeter.

Figure 13:
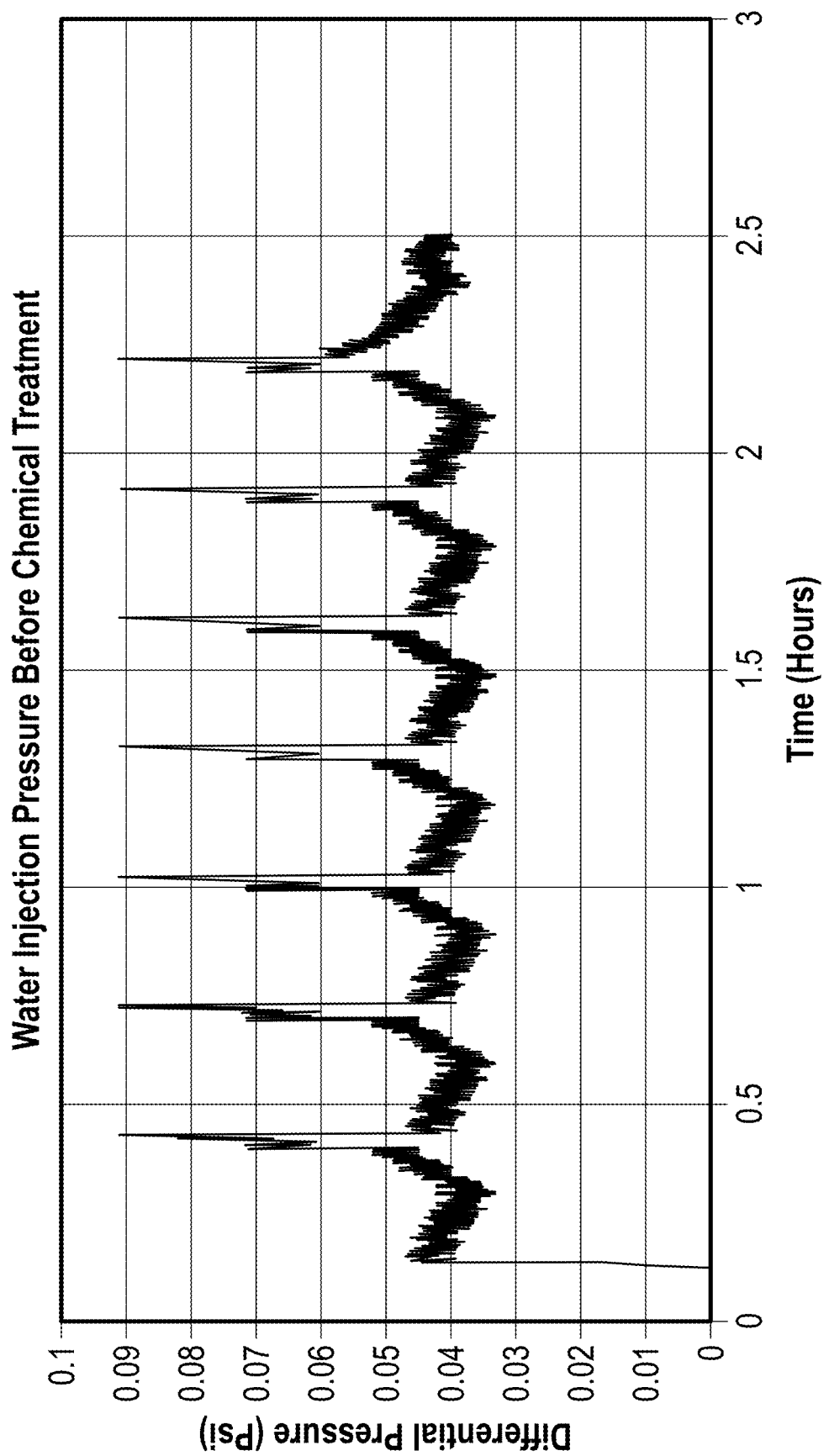
FIG. 13 illustrates the injection pressure of water in a fractured core with no previous injections in accordance with one or more embodiments of the present disclosure.
Figure 14:
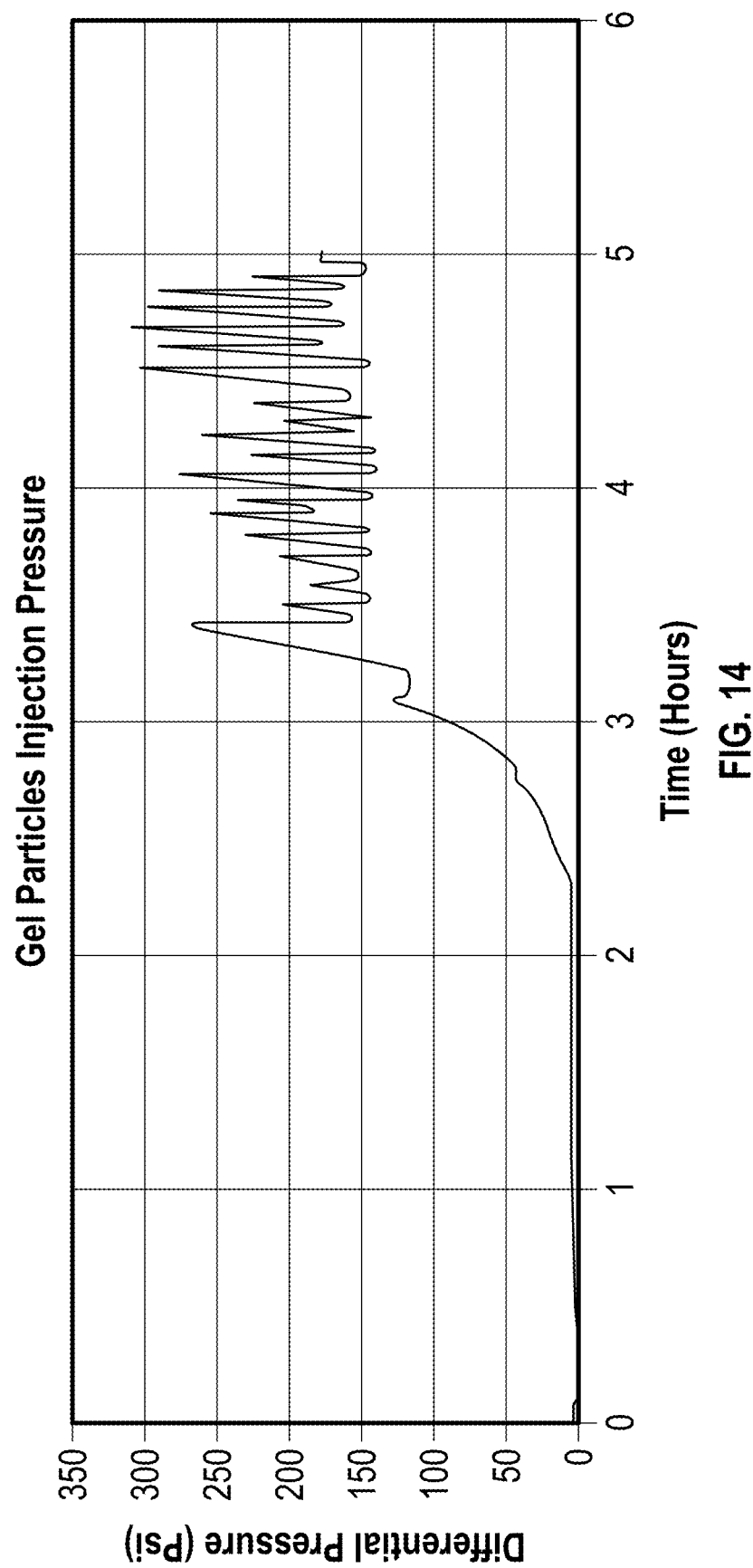
FIG. 14 illustrates the injection pressure of gel particles in a fractured core in accordance with one or more embodiments of the present disclosure.

FIG. 13 shows the injection pressure using water in the fractured core before applying any chemical treatment. The measured pressure of 0.04 psi is low due to the fracture. FIG. 14 shows the injection pressure of gel particles swelled in water. The gel particles have a resultant particle size of approximately 2500 μm after swelling. The measured pressure stabilized with an average pressure of 200 psi.

Figure 15:
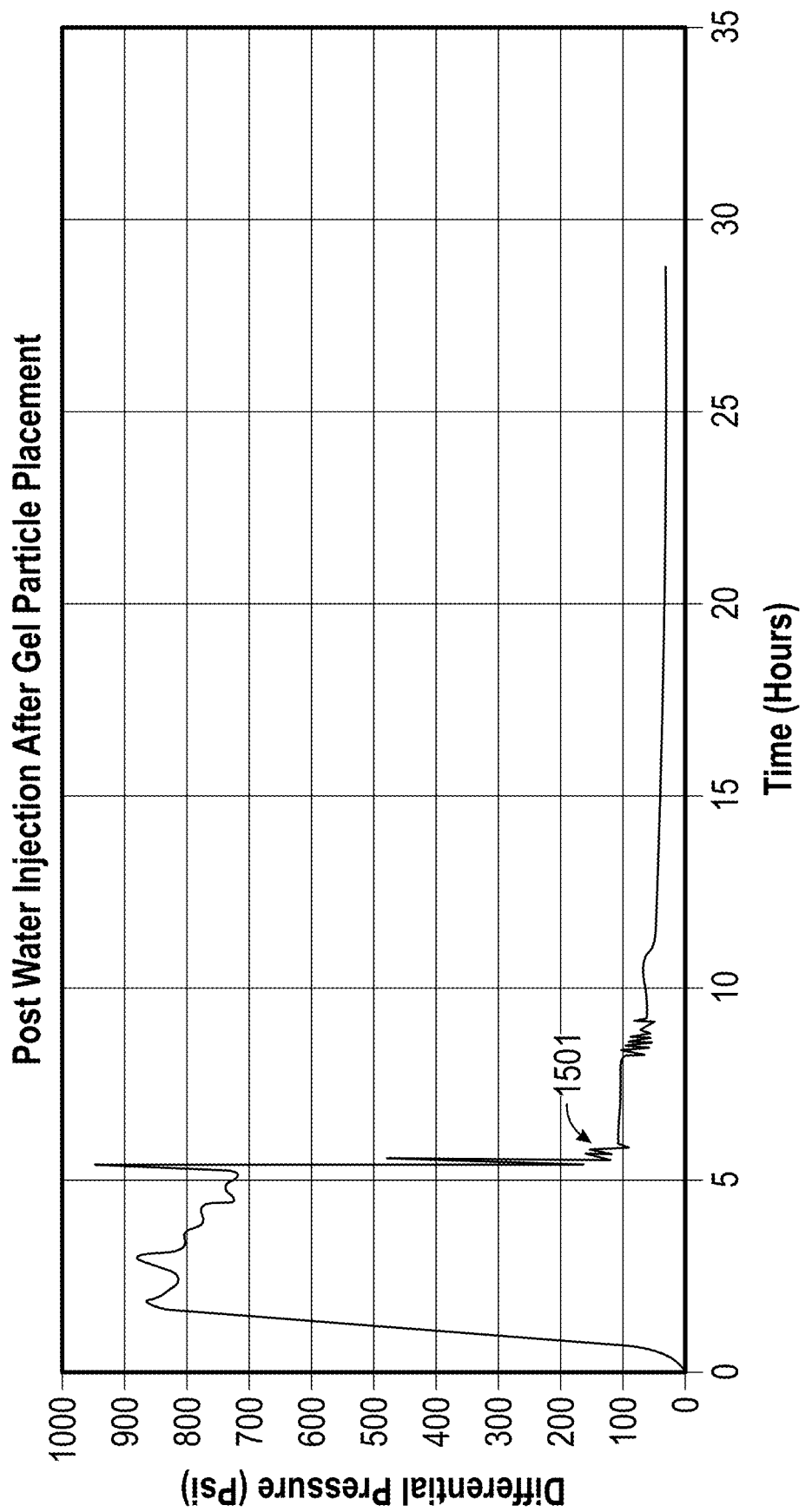
FIG. 15 illustrates the injection pressure of water in a fractured core after gel particle placement in the fracture in accordance with one or more embodiments of the present disclosure.

A post water injection was performed after gel particle placement in the fracture shown in FIG. 12 to evaluate blocking efficiency in a core flooding test. FIG. 15 shows the differential pressure over time. A sudden increase in pressure up to 800 psi was observed as the water pressure stabilized against the gel-pack formed from the gel-particles. Then, after 5 hours, the pressure suddenly dropped, indicating water break-through 1501 at the outlet of the fractured core plug.

Figure 16A:
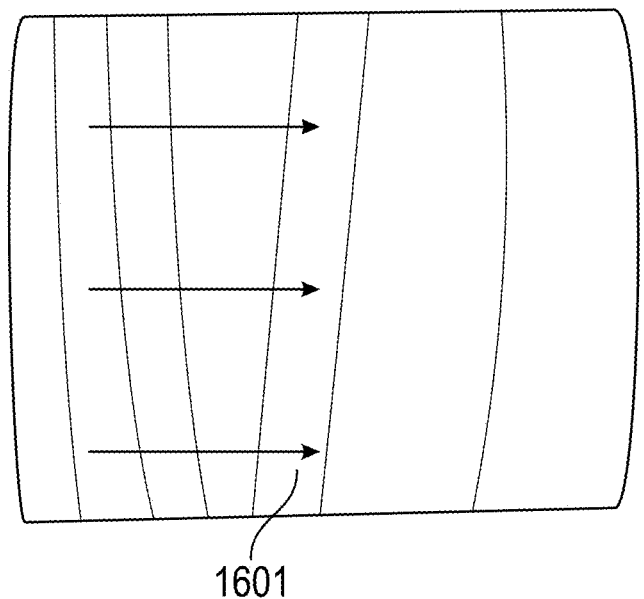
FIGS. 16A, 16B, and 16C illustrate a side view, an end view, and another end view, respectively of a fractured core plug used in core flooding tests after placement of gel particles in accordance with one or more embodiments of the present disclosure.
Figure 16B:
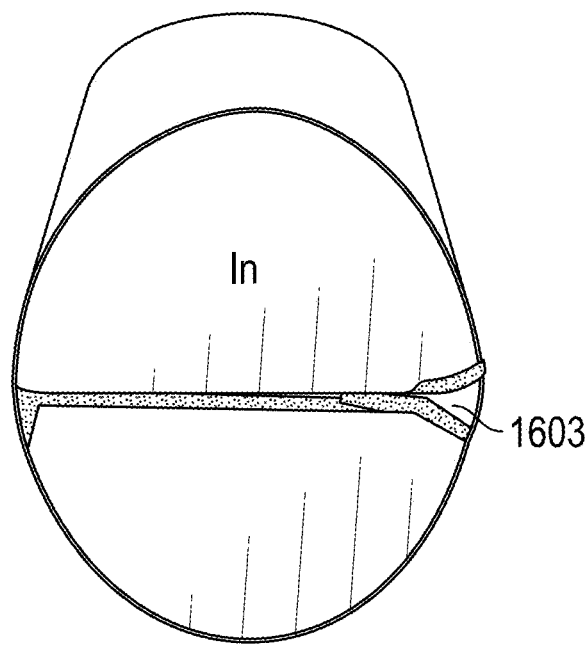
Figure 16C:
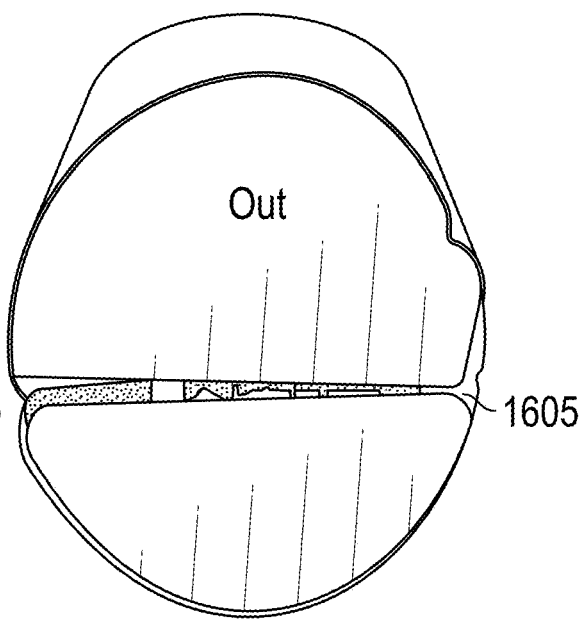

FIGS. 16A, 16B, and 16C illustrate a side view, an end view, and another end view, respectively of the fractured core plug following the experiment depicted in FIG. 15, where gel particles have been placed inside the fracture. The direction of flow is represented by arrows 1601. The fracture 1603 is shown on a first end of the core plug, and the fracture 1605 is shown on a second end of the core plug. Following the experiment, channels were created in the gel particle gel-pack. Experimental results indicated that the plugging efficiency is usually lower if particles swell more because of low gel particle strength.

Figure 17:
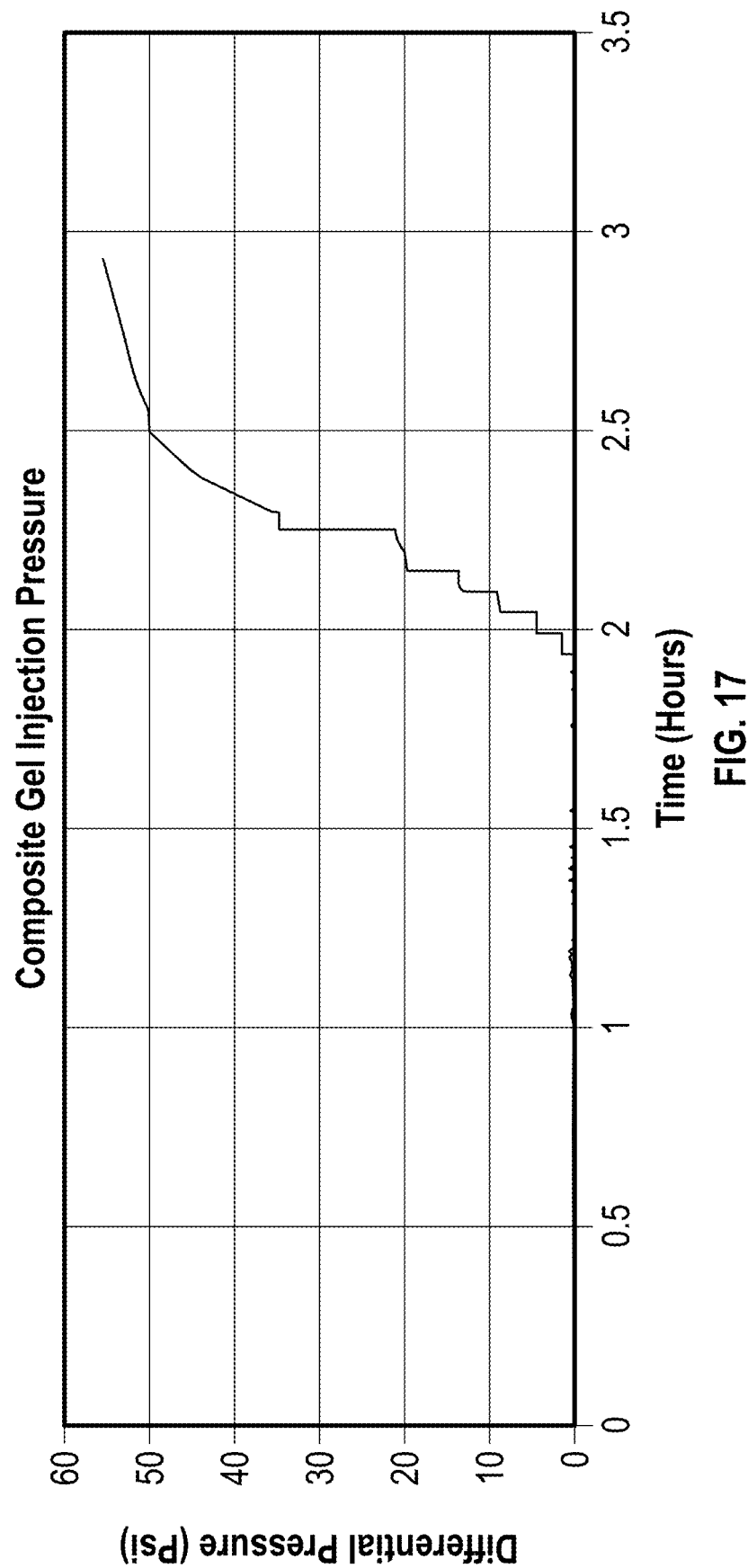
FIG. 17 illustrates the injection pressure of a composite gel in a fractured core in accordance with one or more embodiments of the present disclosure.

Another core plug test was carried out using a similar core plug having the same properties used in the previous tests shown in FIG. 14-16. However, in this test, the composition according to embodiments of the present disclosure was injected into the fracture. Specifically, 4.5 grams (g) of gel particles were mixed with 180 g of colloidal solution containing silica nanoparticles. The solution was allowed to swell the gel particles, and the mixture was injected into the fractures. FIG. 17 is a graph showing the injection pressure of the composition.

Figure 18:
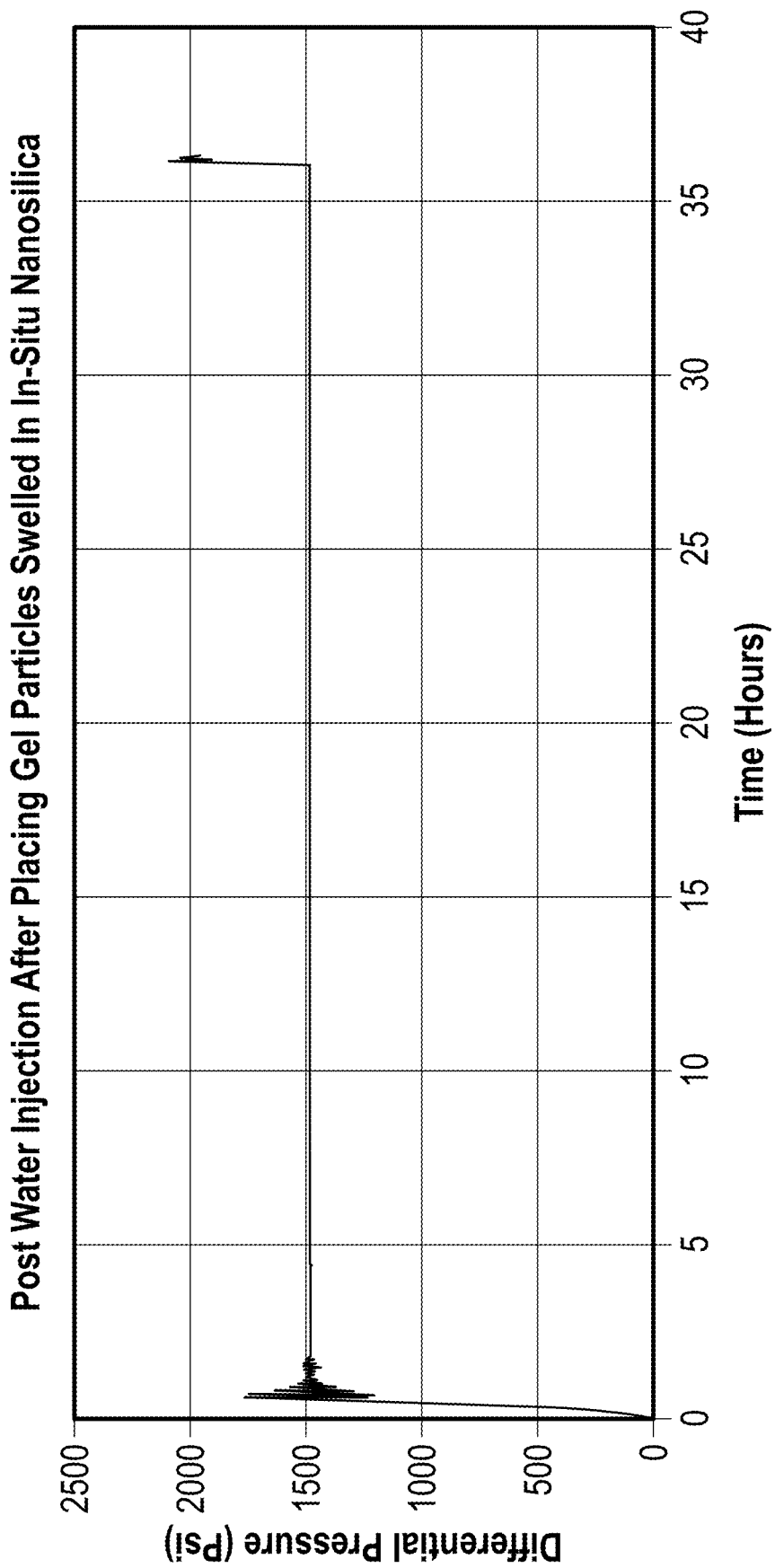
FIG. 18 illustrates the injection pressure of water in a fractured core after composite gel placement in the fracture in accordance with one or more embodiments of the present disclosure.
Figure 19A:
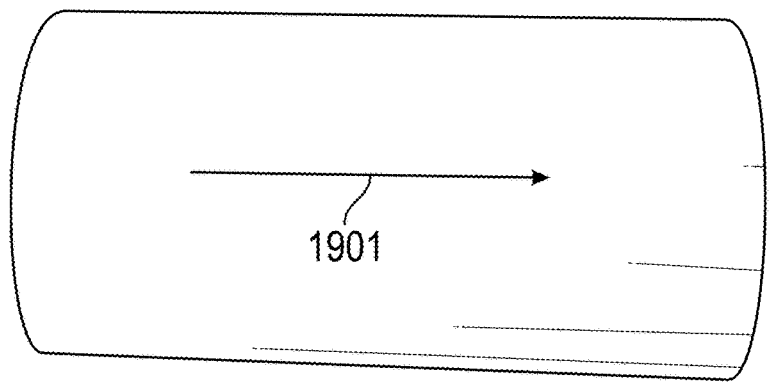
FIGS. 19A, 19B, and 19C illustrate a side view, an end view, and another end view, respectively of a fractured core plug used in core flooding tests after placement of composite gel in accordance with one or more embodiments of the present disclosure.
Figure 19B:
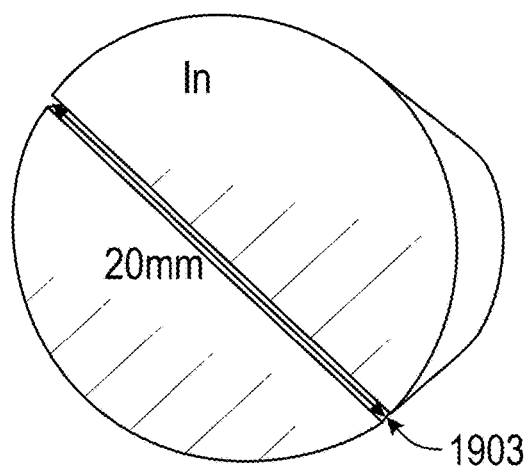
Figure 19C:
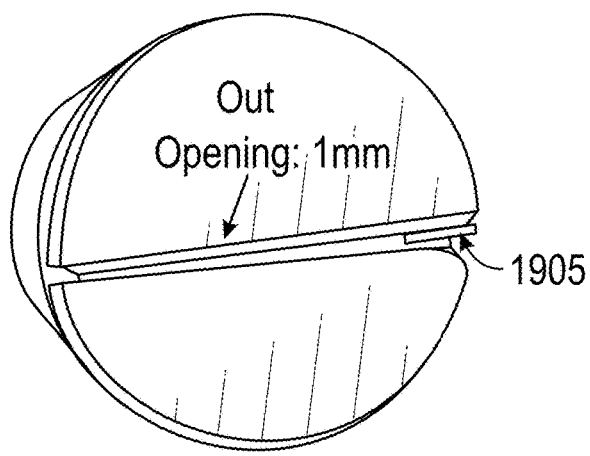

FIG. 18 shows results of a core flooding test after injecting the composition into the fracture and allowing composite gels to form. Water was injected as a post injection step to evaluate the blocking efficiency. A sudden increase in the injection pressure indicated that the fracture had been plugged. As illustrated in FIG. 18, pressure was maintained at 1500 psi for more than 30 hours with no sign of water break-through. The pressure increased to 2000 psi at approximately 37 hours and held, indicating that the fracture had been fully blocked. FIGS. 19A, 19B, 19C illustrate a side view, an end view, and another end view, respectively of the fractured core plug after the experiment depicted in FIG. 18 was performed. The direction of flow is illustrated by arrows 1901 along with fractures 1903 and 1905 on a first end and a second end, respectively, of the core plug. The composite gel did not exhibit the channels seen in FIG. 16.

Although only a few example embodiments have been described in detail above, those skilled in the art will readily appreciate that many modifications are possible in the example embodiments without materially departing from this invention. In addition, many modifications will be appreciated by those skilled in the art to adapt a particular instrument, situation, or material to embodiments of the disclosure without departing from the essential scope thereof. Accordingly, all such modifications are intended to be included within the scope of this disclosure as defined in the following claims. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative.

Furthermore, any apparatus described herein may be free of any component not expressly recited or disclosed herein. Any method or system may lack any step not recited or disclosed herein. Likewise, the term "comprising" is considered synonymous with the term "including." Whenever a method, composition, element or group of elements is preceded with the transitional phrase "comprising," it is understood that we also contemplate the same composition or group of elements with transitional phrases "consisting essentially of," "consisting of," "selected from the group of consisting of," or "is" preceding the recitation of the composition, element, or elements and vice versa.

Unless otherwise indicated, all numbers expressing quantities of ingredients, properties such as molecular weight, reaction conditions, and so forth used in the present specification and associated claims are to be understood as being modified in all instances by the term "about." Accordingly, unless indicated to the contrary, the numerical parameters set forth in the following specification and attached claims are approximations that may vary depending upon the desired properties sought to be obtained by one or more embodiments described herein. At the very least, and not as an attempt to limit the application of the doctrine of equivalents to the scope of the claim, each numerical parameter should at least be construed in light of the number of reported significant digits and by applying ordinary rounding techniques.

What is claimed:

1. A composition comprising:
    a colloidal solution comprising a solvent, a plurality of silica nanoparticles dispersed in the solvent;
    an activator dissolved in the colloidal solution, where the activator is selected from the group consisting of sodium silicate, sodium chloride, and potassium chloride; and
    a plurality of gel particles suspended in the colloidal solution,
    wherein the activator activates gelation of the colloidal solution under formation conditions, forming a composite gel comprising the plurality of gel particles, and
    wherein the composite gel exhibits an elasticity ranging from 20,000 to 30,000 Pa.

2. The composition of claim 1, wherein the plurality of gel particles are water-swellable.

3. The composition of claim 1, wherein the plurality of gel particles comprise a polymer.

4. The composition of claim 3, wherein the polymer is water-swellable.

5. The composition of claim 3, wherein the polymer is selected from the group consisting of N—N methylene bisacrylamide and polyacrylamide.

6. The composition of claim 1 wherein the plurality of gel particles are sized from 500 micrometers to 3000 micrometers.

7. The composition of claim 1, wherein the silica nanoparticles are surface modified with a silanol.

8. The composition of claim 1, wherein the plurality of silica nanoparticles are sized from 10 nanometers to 14 nanometers.

9. The composition of claim 1, wherein the composite gel exhibits a weight loss of less than 25% at 900° C.

10. A method for water shutoff in a formation comprising:
    injecting a composition into a fracture near a water zone in a formation wherein the composition comprises:
    a colloidal solution comprising a solvent, a plurality of silica nanoparticles dispersed in the solvent;
    an activator dissolved in the solvent, where the activator is selected from the group consisting of sodium silicate, sodium chloride, and potassium chloride; and
    a plurality of gel particles suspended in the colloidal solution; and
    allowing the colloidal solution to gel, forming a composite gel comprising the plurality of gel particles,
    wherein the composite gel exhibits an elasticity ranging from 20,000 to 30,000 Pa.

11. The method of claim 10, wherein allowing the colloidal solution to gel occurs in situ in the formation.

12. The method of claim 10, further comprising flushing the fracture with the colloidal solution.

13. The method of claim 12, wherein flushing the fracture with the colloidal solution occurs prior to injecting the composition into the fracture.

* * * * *